(12) United States Patent
Day et al.

(10) Patent No.: US 10,886,739 B2
(45) Date of Patent: Jan. 5, 2021

(54) SYSTEMS AND METHODS FOR GRID APPLIANCES

(71) Applicant: Trane International Inc., Davidson, NC (US)

(72) Inventors: Michael Sean Day, Sacramento, CA (US); Matthew M. Corulli, Bellevue, WA (US); Stephen A. Kujak, Brownsville, MN (US); Ronald Maurice Cosby, II, La Crosse, WI (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 15/994,790

(22) Filed: May 31, 2018

(65) Prior Publication Data

US 2019/0372346 A1 Dec. 5, 2019

(51) Int. Cl.
| | |
|---|---|
| *G06F 1/32* | (2019.01) |
| *G06Q 50/06* | (2012.01) |
| *H02J 3/14* | (2006.01) |
| *H02J 3/38* | (2006.01) |
| *G06F 1/3203* | (2019.01) |
| *H02J 3/00* | (2006.01) |

(52) U.S. Cl.
CPC .............. *H02J 3/14* (2013.01); *G06F 1/3203* (2013.01); *G06Q 50/06* (2013.01); *H02J 3/383* (2013.01); *H02J 3/386* (2013.01); *H02J 3/003* (2020.01)

(58) Field of Classification Search
CPC .... H02J 3/14; H02J 3/383; H02J 3/386; H02J 2003/003; G06F 1/3203; G06Q 50/06

USPC ......................................... 307/48, 23, 66, 82
See application file for complete search history.

(56) References Cited

U.S. PATENT DOCUMENTS

| | | |
|---|---|---|
| 5,444,851 A | 8/1995 | Woest |
| 5,462,225 A | 10/1995 | Massara et al. |
| 5,522,044 A | 5/1996 | Pascucci et al. |
| 5,598,566 A | 1/1997 | Pascucci et al. |
| 5,930,773 A | 7/1999 | Crooks et al. |
| 7,501,713 B2 | 3/2009 | Fein et al. |
| 8,352,083 B2 | 1/2013 | Ng |
| 8,410,351 B1 | 4/2013 | Gu |
| 8,463,449 B2 | 6/2013 | Sanders |
| 8,473,250 B2 | 6/2013 | Adest et al. |
| 8,556,188 B2 | 10/2013 | Steinberg |
| 8,840,033 B2 | 9/2014 | Steinberg |
| 8,843,238 B2 | 9/2014 | Wenzel et al. |
| 8,880,231 B2 | 11/2014 | Boucher et al. |
| 8,907,202 B1 | 12/2014 | Brusaw et al. |
| 8,982,590 B2 | 3/2015 | Giraut Ruso et al. |
| 9,007,460 B2 | 4/2015 | Schmidt et al. |
| 9,054,559 B2 | 6/2015 | Marks De Chabris |
| 9,422,922 B2 | 8/2016 | Sant'Anselmo et al. |
| 9,471,045 B2 | 10/2016 | Scelzi |

(Continued)

*Primary Examiner* — Rexford N Barnie
*Assistant Examiner* — Toan T Vu
(74) *Attorney, Agent, or Firm* — The Salerno Law Firm, P.C.

(57) ABSTRACT

Embodiments of systems and methods for power demand management are described herein. More specifically, embodiments comprise systems and methods for powering, controlling, and/or operating various types of controllable load for integration with power fluctuations from intermittent power generation plants, such as photovoltaic arrays and wind turbine farms.

8 Claims, 10 Drawing Sheets

(56) References Cited

U.S. PATENT DOCUMENTS

| | | |
|---|---|---|
| 9,843,193 B2 | 12/2017 | Getsla |
| 10,007,999 B2 | 6/2018 | Hamann et al. |
| 10,079,317 B2 | 9/2018 | Gonatas |
| 10,103,548 B2 | 10/2018 | He et al. |
| 2007/0043478 A1 | 2/2007 | Ehlers et al. |
| 2009/0078300 A1 | 3/2009 | Ang et al. |
| 2010/0286937 A1 | 11/2010 | Hedley et al. |
| 2011/0046798 A1 | 2/2011 | Imes et al. |
| 2011/0289953 A1* | 12/2011 | Alston ............... B60H 1/32 62/238.6 |
| 2013/0054211 A1 | 2/2013 | Franke et al. |
| 2013/0054758 A1 | 2/2013 | Imes et al. |
| 2013/0054863 A1 | 2/2013 | Imes et al. |
| 2013/0073099 A1 | 3/2013 | Bronicki |
| 2013/0168961 A1 | 7/2013 | Stahlkopf et al. |
| 2013/0192216 A1 | 8/2013 | Berlin, Jr. et al. |
| 2013/0257157 A1 | 10/2013 | Sun |
| 2013/0338837 A1 | 12/2013 | Hublou et al. |
| 2014/0078793 A1* | 3/2014 | Sivakumar ............ H02H 7/122 363/55 |
| 2014/0129040 A1 | 5/2014 | Emadi et al. |
| 2014/0249680 A1 | 9/2014 | Wenzel |
| 2014/0277761 A1 | 9/2014 | Matsuoka et al. |
| 2014/0277769 A1 | 9/2014 | Matsuoka et al. |
| 2014/0277795 A1 | 9/2014 | Matsuoka et al. |
| 2014/0278107 A1 | 9/2014 | Kerrigan et al. |
| 2014/0278108 A1 | 9/2014 | Kerrigan et al. |
| 2014/0285010 A1* | 9/2014 | Cameron ............... H02J 7/34 307/29 |
| 2014/0330611 A1 | 11/2014 | Steven et al. |
| 2014/0372577 A1 | 12/2014 | Hui et al. |
| 2015/0066404 A1 | 3/2015 | Scelzi |
| 2015/0168001 A1 | 6/2015 | Steinberg |
| 2015/0178865 A1 | 6/2015 | Anderson et al. |
| 2015/0214787 A1 | 7/2015 | Gerhardinger et al. |
| 2015/0229131 A1 | 8/2015 | Gerhardinger |
| 2016/0118846 A1 | 4/2016 | Huang et al. |
| 2016/0201864 A1 | 7/2016 | Liu et al. |
| 2016/0329708 A1 | 11/2016 | Day |
| 2017/0089627 A1* | 3/2017 | Lee ............... F25B 49/025 |
| 2018/0039891 A1 | 2/2018 | Hamann et al. |
| 2018/0197252 A1* | 7/2018 | Bollermann ........... G06Q 50/06 |
| 2018/0275314 A1 | 9/2018 | Pavlovski et al. |

\* cited by examiner

SYSTEMS AND METHODS FOR GRID APPLIANCES

BACKGROUND

1. Technical Field

The present invention relates to systems and methods for grid appliances for use during periods of high demand and low demand, and in particular, to systems and methods for deploying and operating a distributed network of grid appliances that produce reliable and controllable grid impacts.

2. Background of Related Art

Generation assets in an electrical distribution grid can include generation plants that provide generally constant and controllable output, such as for example, coal-fired generating plants, nuclear generating plants, and hydroelectric power plants. Generation assets may additionally or alternatively include so-called renewable energy plants that provide intermittent output, such as solar plants having output that varies depending on sun position and cloud cover, or wind farms having output that is dependent on prevailing winds.

Electrical distribution grids which rely in whole or in part on intermittent generation assets face challenges when demand exceeds capacity, or, conversely, when environmental conditions cause excess electricity to be generated.

SUMMARY

In an example embodiment, the present disclosure describes a system for controlling the connected electric and cooling loads in electric grids with intermittent generation assets. The disclosed system includes a renewable energy system, a motor controller, an inverter, a large-scale equipment system, and an auxiliary large-scale equipment system. In some embodiments, the system includes a thermal energy storage system.

In some embodiments, the motor controller receives data from the inverter via a communication link. In some embodiments, the data comprises information related to variation in output power.

In some embodiments, the large-scale equipment system includes a chiller. In some embodiments the system includes an electric energy storage system, wherein the electric energy storage system is configured to allow the storage and rapid release of electrical energy. In some embodiments, the renewable energy system is isolated from the electric grid.

In another example embodiment, the present disclosure describes a system for controlling the load in electric supply grids with intermittent generation assets. The system includes a renewable energy system; a bus bar connected to grid power; a motor controller; an inverter; a large-scale equipment system; and an auxiliary large-scale equipment system. In some embodiments, the system includes a thermal energy storage system. In some embodiments, the motor controller receives data from the inverter via a communication link. In some embodiments, the data includes information related to variation in output power. In some embodiments, the grid power can be used to balance the needed power of the auxiliary large-scale equipment system and the power supplied by the renewable energy system.

In yet another example, the present disclosure describes a method of balancing a load of a large-scale equipment system. In an embodiment, the method includes supplying power to an inverter via a renewable energy system; sending data comprising from an inverter to a motor controller; and adapting the connected load via the motor controller the meet the amount of load power needed, wherein the data comprises information on the variation in output power from the renewable energy system. In some embodiments, the method includes supplying additional power to meet the amount of load power needed. In some embodiments, the additional power may be supplied via an electric energy storage system. In some embodiments, the additional power may be supplied via grid power and bus bar.

In a further example embodiment, the present disclosure describes a grid appliance having one or more base pieces of equipment; one or more auxiliary pieces of equipment; wherein the one or more base pieces of equipment and auxiliary pieces of equipment comprise pressurization equipment that function at or approximately at cube law performance effect; the one or more base pieces of equipment comprise variable speed drives; the one or more auxiliary pieces of equipment are capable of providing the missing flow of the one or more base pieces of equipment when the one or more base pieces of equipment are curtailed; and the total power consumption of the appliance running with the one or more base pieces of equipment curtailed and the one or more auxiliary pieces is less than the appliance running with the one or more base pieces of equipment at full flow.

In still another example embodiment, the present disclosure describes an energy storage aerator system having a high pressure air compressor; a pressure vessel; a pressure reduction device; and a load, wherein the high pressure air compressor can fill the pressure vessel with compressed air; high pressure air is discharged from the pressure vessel and is conducted to a pressure reduction device; the pressure reduction device can generate power on a shaft when the air pressure is reduced in the pressure reduction device; and the power generated during the pressure reduction can be harnessed to power a load.

In still another further example the present disclosure describes a system for improving an air compressor that includes a high pressure air compressor; a pressure vessel; a pressure reduction device; an air drive motor; and a base air compressor; wherein the high pressure air compressor can fill the pressure vessel with compressed air; high pressure air is discharged from the pressure vessel and is conducted to a pressure reduction device; lower pressure air exiting the pressure reduction device powers the air drive motor; exhaust from the air drive motor is combined with ambient air, thereby reducing the temperature and moisture of the ambient air; and the combined air stream is used by the base air compressor.

BRIEF DESCRIPTION OF THE DRAWINGS

To facilitate further description of the embodiments, the following drawings are provided. The same reference numerals in different figures denote the same elements.

DETAILED DESCRIPTION

As electrical power becomes more in demand, at times there is a shortage in supply. This can result in brownout situations. To counter such situations, new regulations have or may be adopted with regards to power consumption. In addition, some users can profit by selling power back to electrical utility providers. Furthermore, Transmission and Distribution Deferral (T&D Deferral) and long-term utility contracts, such as, for example, Power Purchase Agreements (PPAs) also can be used to ensure that there is enough electrical supply. As seen through these options, controllable load (up and down) is important in balancing the electrical grid.

Renewable generation assets such as solar and wind power are often highly intermittent in output, and their rate of change of power output often exceeds the rate of change that large equipment such as chillers, air compressors or other large loads can change their loads. The inability of a load to follow this rapidly declining or increasing generation results in one of several negative outputs.

If the generation output decreases faster than the load can decrease (such as when a cloud suddenly reduces solar Photovoltaic output), the result is a degraded and possibly damaging reduction in power quality to the load. On the other hand, if the generation output increases faster than the load, surplus energy would need to be "dumped" thereby wasting valuable renewable energy.

In addition, there are many market-driven reasons why an owner would want to ensure that a load is entirely or mostly powered by renewable resources. These could include the ability to claim that a product or service is carbon free, to gain access to certain markets that are restricted to products of renewable generation, or to qualify for certain local, state, or national incentives applicable only to renewable energy. By solving the ramping issues associated with intermittent renewables, chillers, compressors and other large but slowly responding loads could qualify as part of a paired energy storage/renewable energy installation by being directly powered by those renewable but intermittent resources.

Figure 1:
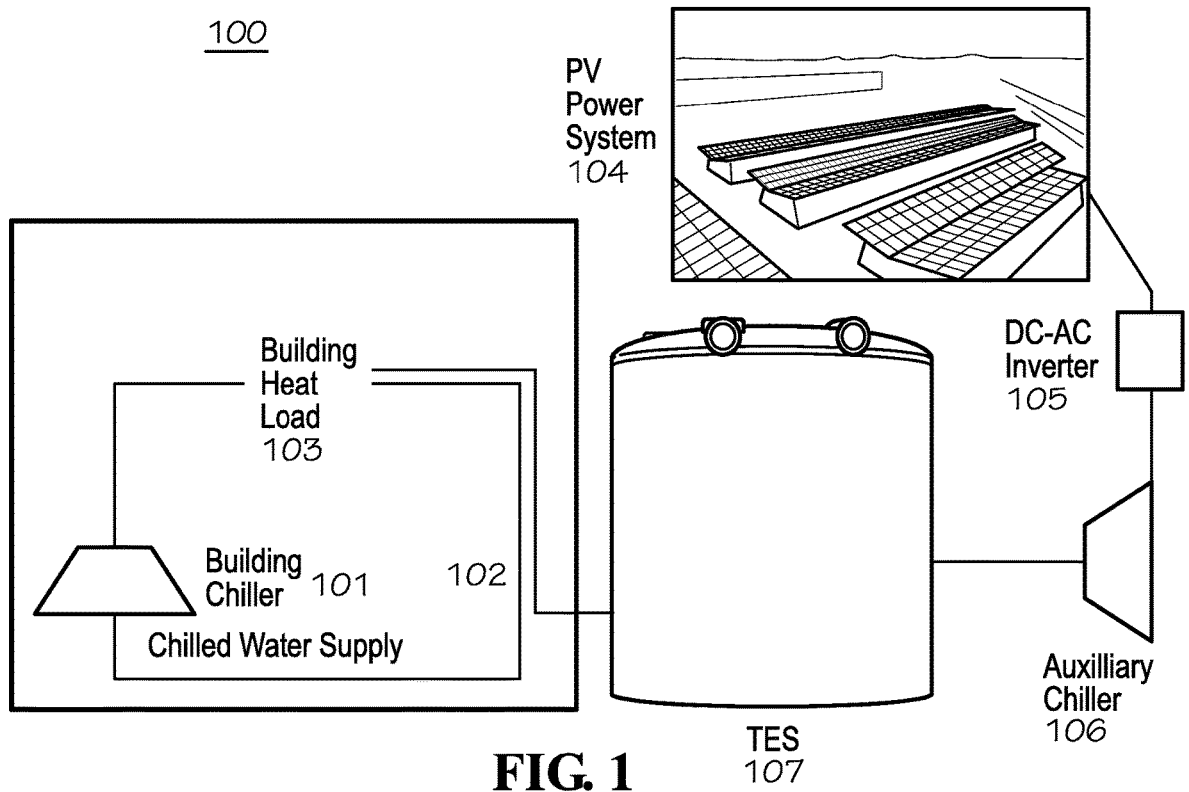
FIG. 1 illustrates an example of an equipment system powered by a renewable energy source, according to one or more embodiments of the present disclosure.

With reference to the drawings, FIG. 1 illustrates a system 100 according to at least one embodiment of the present invention. In normal operation, a chiller 101 produces chilled water for the chilled water supply system 102. The chilled water supply system can provide cooling to the building heat load 103.

According to an exemplary embodiment, a solar photovoltaic (PV) power system 104 is installed at the building. The solar PV system 104 feeds direct current electric power to a DC-AC inverter 105. The inverter 105, which converts the direct current power generated by the solar PV system 104 into alternating current, which is usable by a chiller. The output of the inverter 105 feeds a dedicated auxiliary chiller 106. The auxiliary chiller may feed the building heat load 103 directly, a thermal energy storage system (TES) 107 for use at a later time, or a combination of the two. It should be noted that the above embodiment is only exemplary, and other embodiments may contain more or less elements. For example, in some systems, it may be desired to leave the current as direct current, and, therefore, an inverter would not be required.

Figure 2:
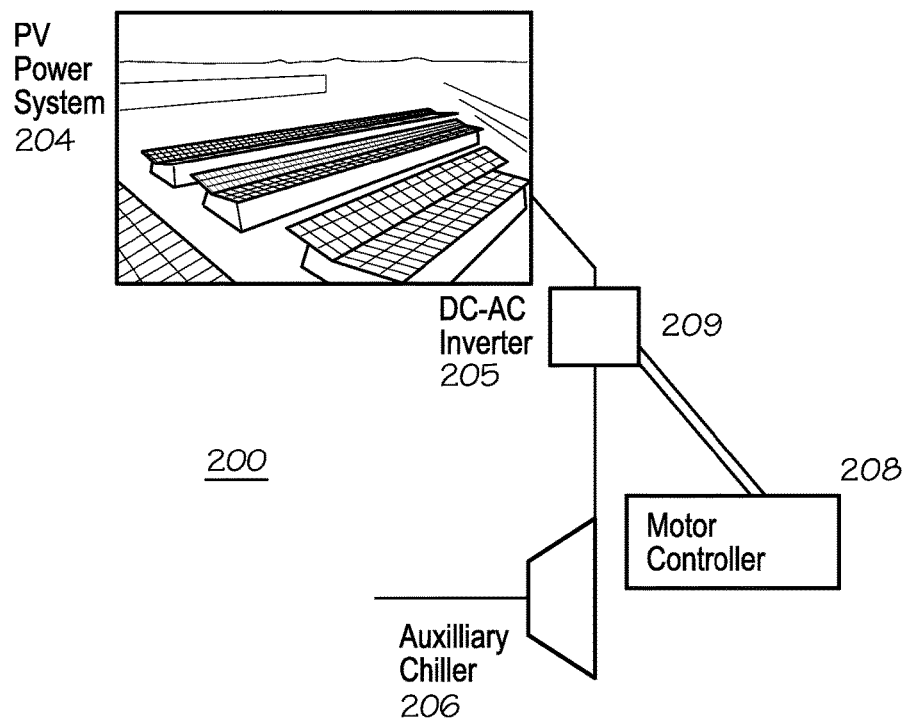
FIG. 2 illustrates an example of an equipment system powered by a renewable energy source, according to one or more embodiments of the present disclosure.

FIG. 2 illustrates an exemplary embodiment of a system 200. System 200 can comprise elements that will fit within system 100. As can be seen in the example of FIG. 2, the control of the auxiliary chiller 206 is shown in greater detail. Auxiliary chiller 206 can be the same as, or similar to, auxiliary chiller 106 (FIG. 1). Auxiliary chiller 206 can be controlled by a motor controller 208. Motor controller 208 often operates in accordance with instructions from a Building Automation System. However, controller 208 can be designed to have extra data input. For example, motor controller 208 can also receive data from the DC-AC Inverter 205 (which can be the same as, or similar to, inverter 105) via a communication link 209. Communication link 209 can be either an open protocol such as Modbus or a proprietary communication protocol. The purpose of the communication is to give the motor controller 208 information on the variation in output power. As such, the motor controller 208 can adapt the connected load to meet the amount of output power on a moment by moment basis.

This controllable electric grid impact capability is made easier since the auxiliary chiller 206 is not restrained by the size of the load. Consider the following examples:

In Example A, if the building heat load 103 is greater than the output of the auxiliary chiller 206, then the existing building chiller 101 can be ramped down to supply whatever marginal additional cooling that is required beyond that provided by the auxiliary chiller 206.

In Example B, if the output of auxiliary chiller 206 exceeds the building heat load 103, the additional marginal cooling generated can be stored in the Thermal Energy Storage System (TES system) 107. The result is that in most cases the auxiliary chiller is either using the energy to produce cooling for use either immediately (as seen in Example A) or later (as seen in Example B), while restricting itself to matching the power output of the variable resource, such as, for example, the PV power system 204.

There may be examples, however, where the moment-by-moment load following capabilities of the chiller are not fast enough to match the variation in generation, as the output of the renewable generator (such as, for example, PV power system 204) may change faster than the ability of the auxiliary chiller 206 allows.

Figure 3:
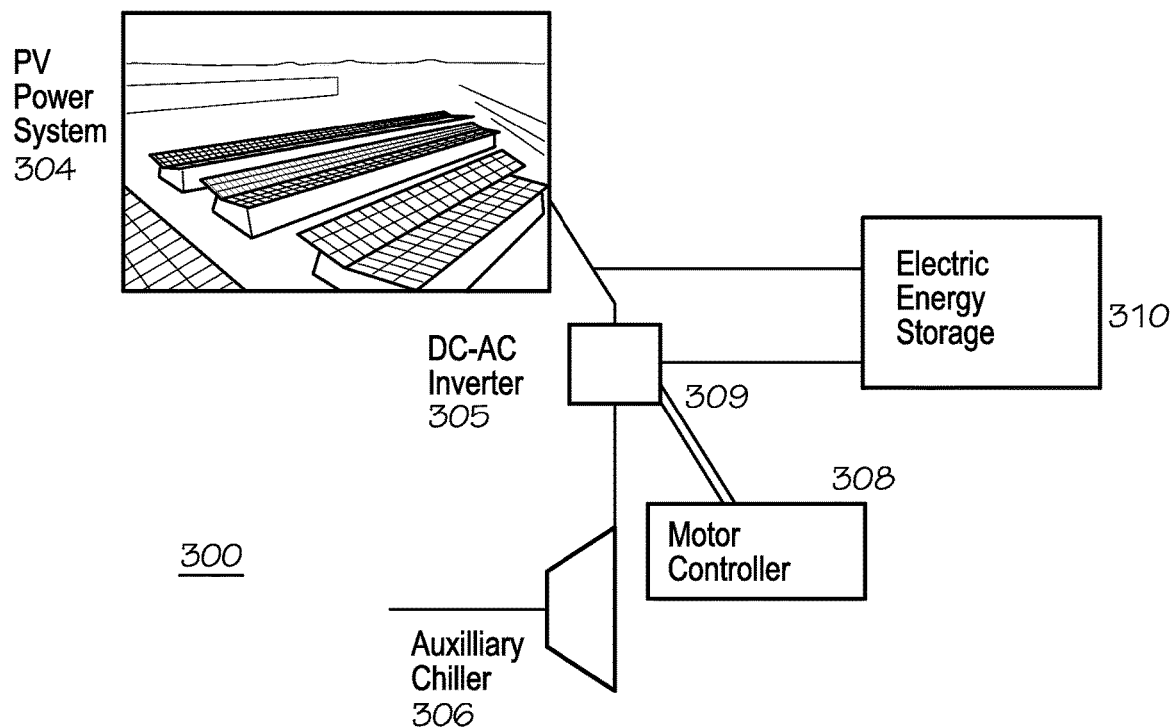
FIG. 3 illustrates an example of an equipment system powered by a renewable energy source, according to one or more embodiments of the present disclosure.

FIG. 3 illustrates an example of an auxiliary system according to one or more embodiments of the present invention. In FIG. 3, part of the renewable energy generated by the PV Power System 304 (PV power system 304 can be the same as or similar to the PV power systems 104 and/or 204) goes into an electric energy storage system 310. Storage system 310 can comprise batteries, flywheels, capacitors, and/or any other technology that allows the storage and rapid release of electrical energy. In such a case, should a ramping down of power by PV Power System 304 exceed the allowable ramping rate ability of auxiliary chiller 304 (auxiliary chiller 304 can be the same as or similar to auxiliary chillers 104 and/or 204), motor controller 308 (controller 308 can be the same as or similar to controller 208) could communicate this to the DC-AC Inverter 305 (inverter 305 can be the same as or similar to inverters 105 and/or 205). This would allow the DC-AC inverter 305 to draw power from the electric energy storage system 310, such that the energy delivered to the auxiliary chiller 306 never exceeds the ramping rate of that device. As mentioned above, it should be noted that the above embodiment is only exemplary, and other embodiments may contain more or less elements. For example, in some systems, it may be desired to leave the current as direct current, and, therefore, there would not be an inverter.

System 300 is a system that is capable of being proactive and interactive. The proactivity comes from the DC-AC inverter 305 informing the motor controller 308 of an impending power reduction before the power reduction is recognized at that point. The interactivity is that the motor controller 308 reacts to this impending change in power (up or down) by changing the load in the most expeditious manner possible. Without this communication with the load as to what its upcoming changes will be, a system would be trying to maintain a power output that could have been superseded by a change in both generation output and the load of the attached equipment.

Use of the electrical energy storage 310 as illustrated in the example of FIG. 3 can isolate the PV power system 304 from the electric grid. Because the only connection between the PV power system 304 and the building is chilled water, the PV system 304 is completely electrically isolated from the electric grid. In this arrangement, there is no chance for power to feed back onto the grid in a potentially dangerous manner because the PV system 304 and inverter 305 are electrically isolated from the building. As such, this arrangement could be of great benefit in places where interconnection agreements are difficult to obtain, as utilities may place a ceiling on the number of renewable energy sources that can be connected to the grid. Furthermore, in some instances, the grid may not be able to support any more renewable energy sources. Thus, in the present embodiment, the building would gain all of the energy impacts of the PV power installations, while simultaneously being subjected to a less difficult (or even eliminated) interconnection process.

Figure 4:
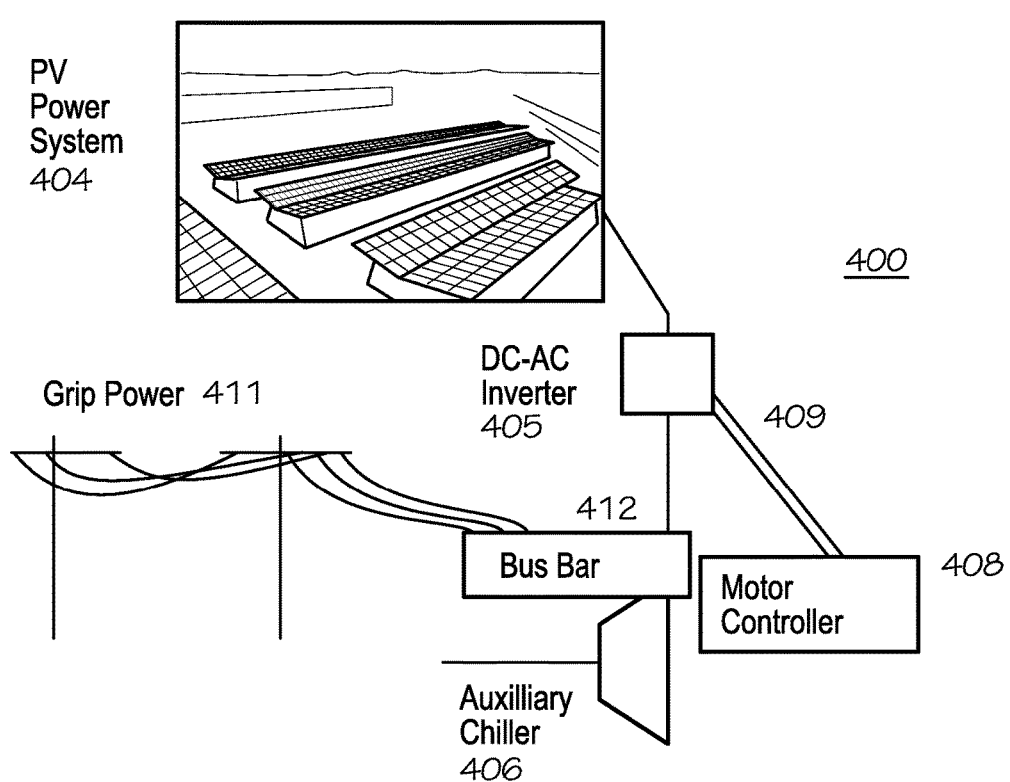
FIG. 4 illustrates an example of an equipment system powered by a renewable energy source, according to one or more embodiments of the present disclosure.

Some exemplary embodiment may not include an electrical energy storage asset. FIG. 4 illustrates an example of such a system 400. In system 400, grid power 411 is routed to a common bus bar 412 that is shared with the power output of the DC-AC inverter 405 (inverter 405 can be the same as or, similar to, inverters 105, 205, and/or 305). In this configuration, the grid power 411 is used to temporarily balance the difference between the reduced output of the inverter 405 and the load of the auxiliary chiller 406 (chiller 406 can be the same as or, similar to, chillers 106, 206, and/or 306). The interplay between the motor controller 408 and inverter 405 means that the duration of needing this supplemental grid energy is shorter, and the amplitude of instantaneous power draw is lower than if the PV Power System 404 were directly tied to the main building bus bar. For localities that levy fees for grid standby services, this reduced need for grid power compared to a standard PV power system installation would result in lower grid costs. While the system would not offer the same level of isolation from the electric grid as the system described in FIG. 3 would offer, since the system in FIG. 4 would only be drawing from the grid the marginal difference between production and consumption instead of the entire reduced output, the system in FIG. 4 would still represent a substantially lower impact from an interconnection standpoint than a traditional PV system.

In addition, although some of the energy used by the system would inevitably come from the grid power connection 411, the interplay between motor controller 408 and the DC-AC inverter 405 would be able to show that the vast majority of kWh on an annualized basis indeed came from the PV power system 404.

Figure 5:
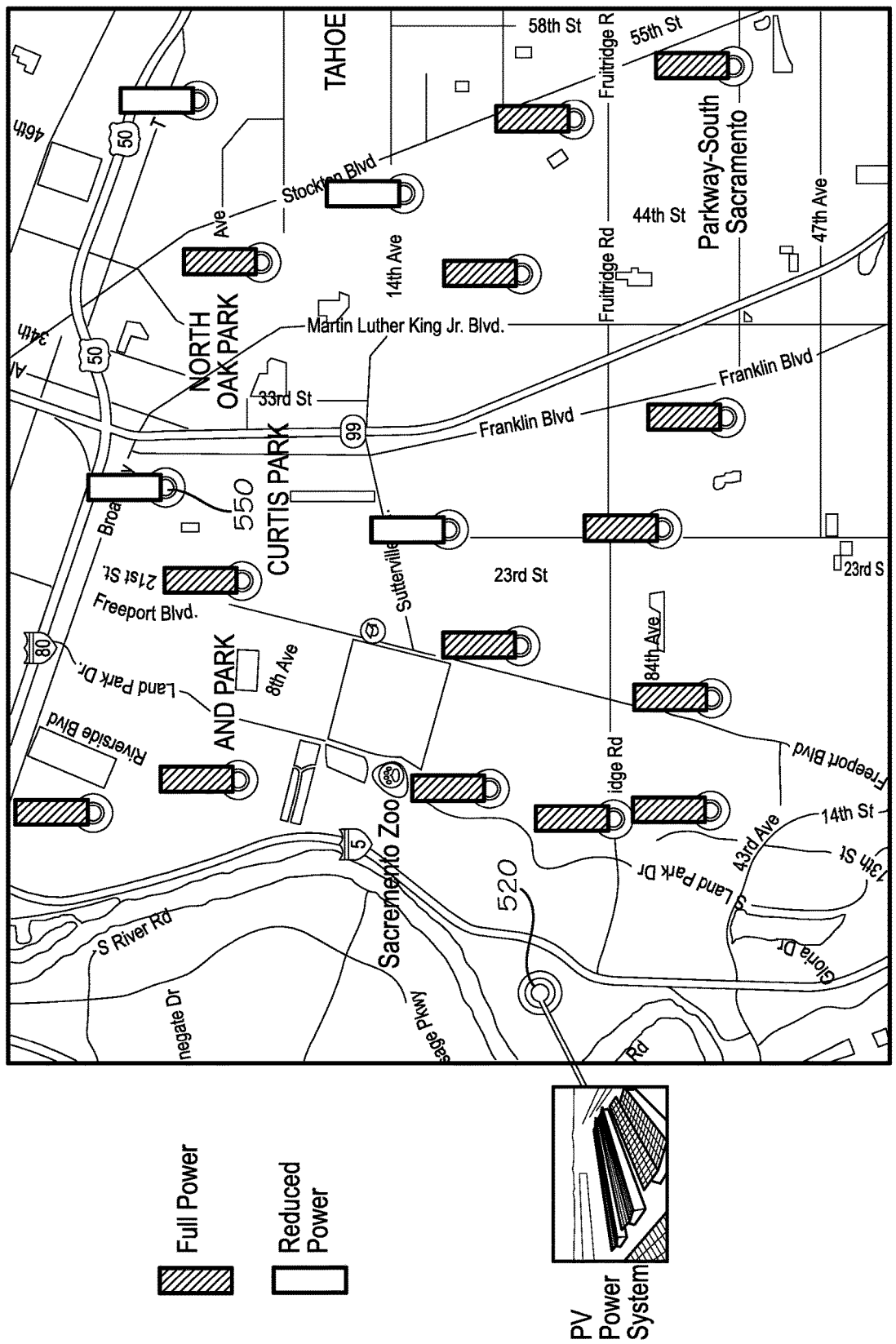
FIGS. 5-5c illustrate the use of multiple geographic locations for anticipation in powering an equipment system, according to one or more embodiments of the present disclosure.
Figure 5A:
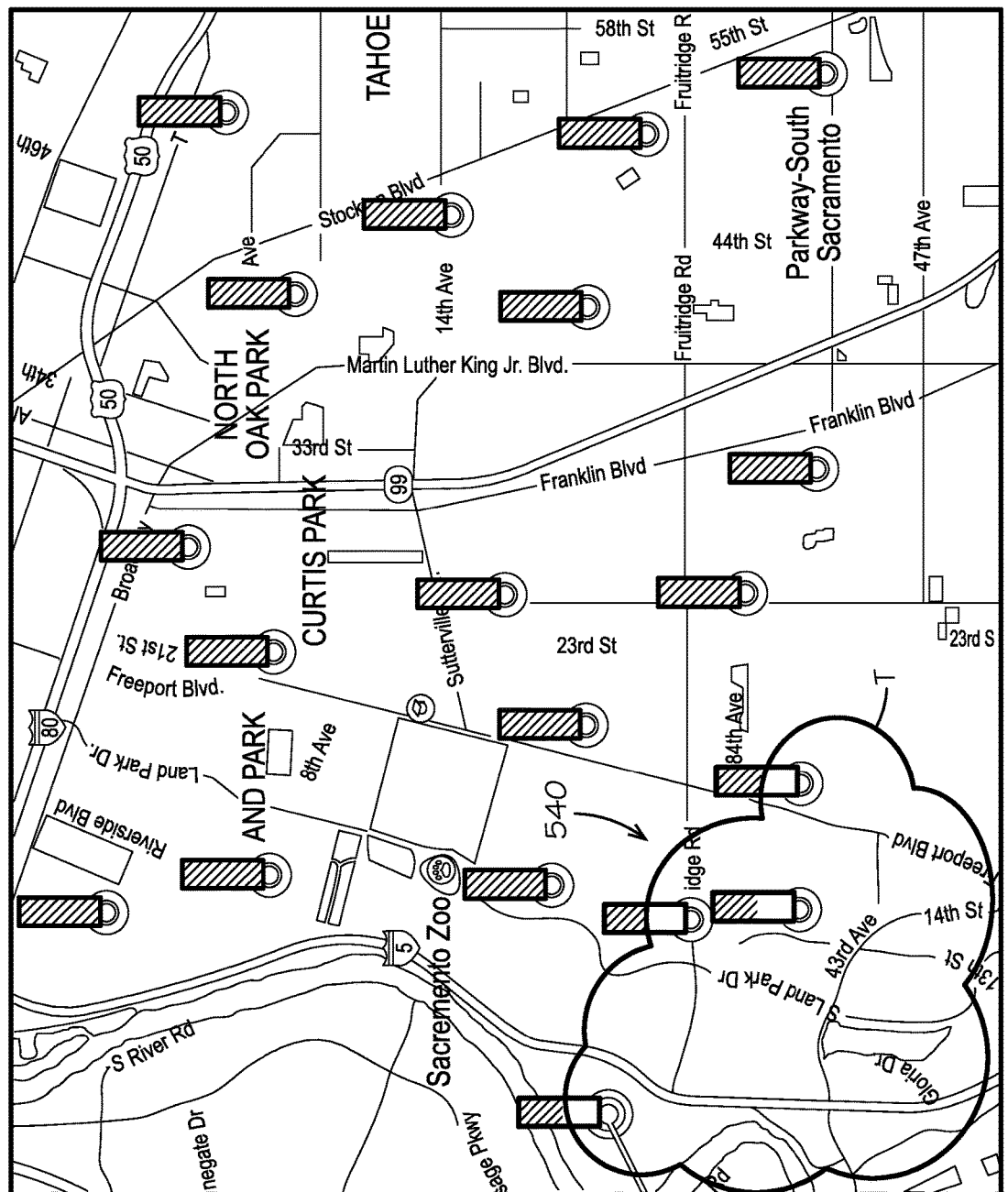
Figure 5A:
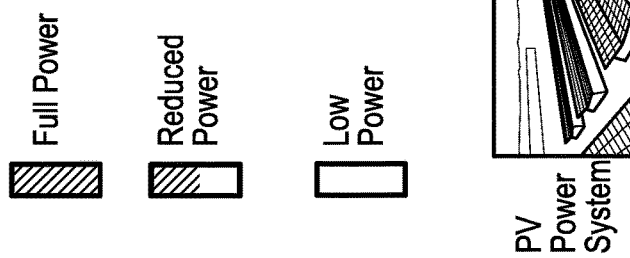
Figure 5B:
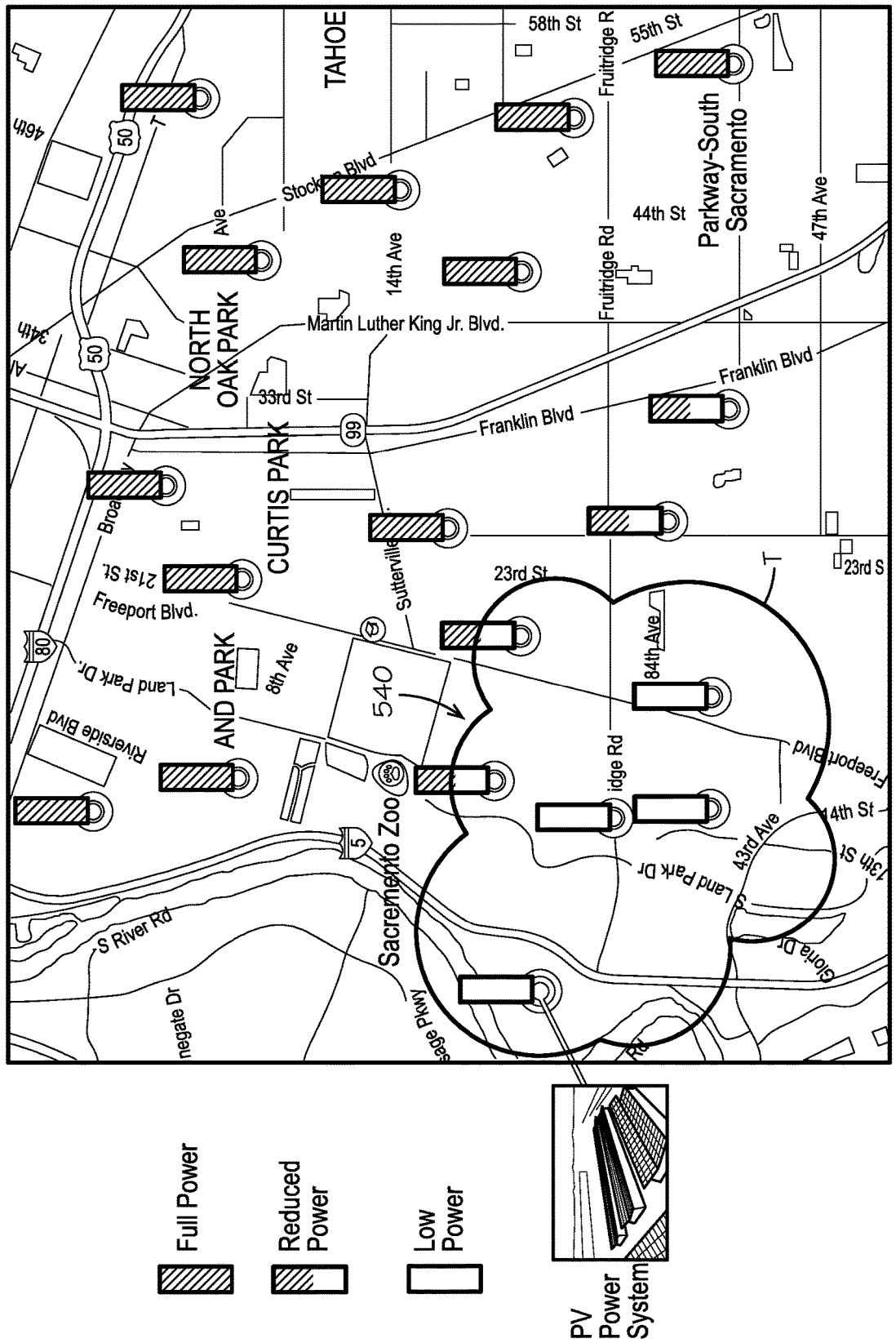

FIG. 5 illustrates an exemplary embodiment in which information from information from a much larger number of geographically distributed locations, as opposed to a single location on a local loop using feedback data from the DC-AC Inverter as described above, to anticipate ramps before they need to occur. In FIG. 5, the building that has been described in previous examples (FIGS. 1-4) represents one data node (520) in a much larger network of sites. Each of these sites provides data on solar output at that individual location. In the example of FIG. 5a, a thunderstorm T enters the area moving from Southwest to Northeast, and begins to shade individual locations, which results in a significant drop in Solar PV output as the cloud shadow reaches each location. This is represented in FIGS. 5a, 5b and 5c as sites moving to intermediate stages of solar capability 530 and 535, and then a completely shaded stage 540 of solar capability as the impact of the cloud shadow spreads to additional locations.

Figure 5C:
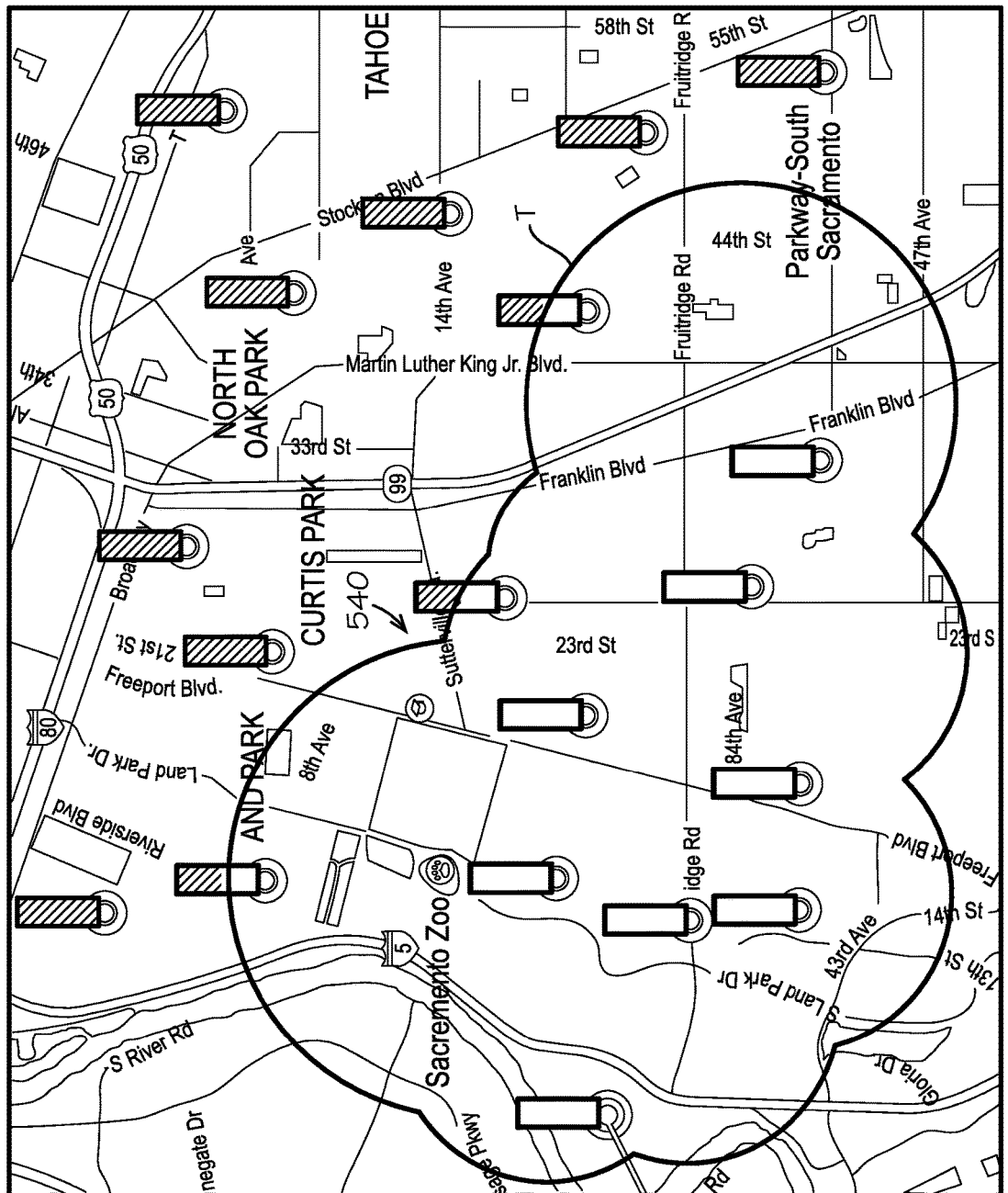
Figure 5C:
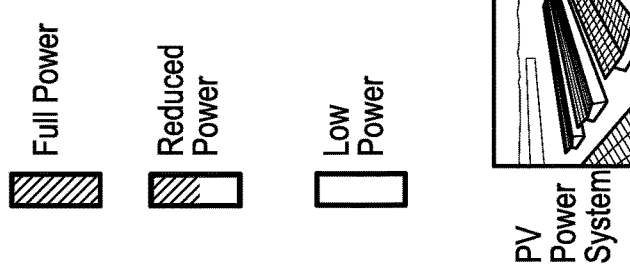

In the example of FIG. 5c, the impacts in terms of reduced solar output have neared maximum at the original location, but have yet to be felt at a site 550 in front of the approaching cloud. By utilizing Geographic Information System data and analytics, the motor controller at location 550 could be informed of the approaching power output reduction before it is seen on the power output of the DC-AC inverter. This additional time would allow the auxiliary Chiller at location 550 to reduce load before the power output actually fell off. This "pre-reduction" would be beneficial in both the examples shown in FIG. 3 and FIG. 4. In a system similar to the example of FIG. 3, a pre-reduction in power results in a reduced usage of the electric energy storage asset 310, potentially increasing the lifetime of that asset. In a system similar to the example of FIG. 4, where the system instead relies upon grid power 411, the pre-reduction results in a lower reliance on grid power 411 when the shadow hits location 550, and therefore a lower overall impact on the grid as a whole. Advantageously, solar PV output sensors and communication devices may be embedded on all standard products. As a manufacturer of rooftop HVAC equipment whose units are increasingly connected to the grid, this would allow an extremely robust data sensor network to be developed quickly, and would include many more data points than just those facilities that are using a PV integration tool like this.

Another way to provide grid saving impacts can comprise using the mechanical advantage available in some fluid pressurization systems to mechanically amplify the grid impacts of a given amount of energy storage. Unlike previous attempts at creating grid appliances that relied upon imposing sacrifices on existing systems in the form of curtailed equipment operation, the present invention uses the mechanical advantage available in some fluid pressurization systems to mechanically amplify the grid impacts of a given amount of energy storage, thus maintaining the efficacy of the system, while curtailing the required load of the system.

Water pumps and air compressors are like many other types of rotary equipment in that the power-to-output ratio is not linear. As flow increases towards 100%, power increases faster. Typically, power consumption increases as the cube of flow, so if flow doubles, power goes up by a factor of 8. While different pieces of equipment have different flow characteristics, in general they follow something approximating a cube law curve.

In cases where there are existing pieces of appropriate types of fluid pressurization equipment, multiple smaller pieces of pressurization equipment may be added as auxiliaries to the base equipment. The auxiliaries are powered by energy storage, and when combined with variable controls on the base equipment, allow the power consumed by the base equipment to be curtailed without a reduction in delivered fluid mass flow or pressure. Because of cube law effects, the aggregate power demand needed by the auxiliary pieces of equipment is significantly less than the amount of grid impact coming from curtailed base equipment operation. Because of this Mechanical Amplification effect, the size of the energy storage can be much less than would be required to directly deliver the same grid impact over the same period. A hybrid grid appliance so constructed can reliably provide needed grid impacts at a lower cost and significantly higher efficiency than an unamplified storage solution, and without the deleterious impacts of a sacrificed-based curtailment without replacement approach.

Existing grid appliances such as demand response portfolios impose a sacrifice when the asset is called. This is often extremely troublesome for the equipment operator to accommodate since many of the pieces of equipment most desirable for inclusion in a portfolio are utilized in critical applications. In these applications, the impact of curtailing the operation of fluid pressurization equipment would impose an unacceptable impact in the operation of the base system. For example, a wastewater treatment plant could have 5 large blowers providing 50,000 SCFM of aeration air and drawing 2 MW of power. The blowers could, due to effects of the cube law on fluid flow dynamics, be turned down to 40,000 SCFM and power usage would drop to approximately 1 MW. While the grid impacts of such a curtailment could be quite valuable, the "missing" 10,000 SCFM would mean that biological oxygen demand of the plant would not be met, with extremely negative consequences for the process. In this case a sacrifice-based curtailment would not be acceptable to the plant.

Batteries could be used here to help power the existing equipment. Using the example above, to get the same grid impact, a battery installation with the ability to provide 1 MW of electrical output for the 6 hours needed at this site could be installed at the plant. The problems with this approach are that the volume of the batteries needed is relatively high, and the cost is so high as to make the approach uneconomical.

A wastewater management facility typically has fluid pressurization equipment as part of a process at that facility. The fluid being pressurized could be a gas, a liquid, or a slurry. The existing pressurization equipment is of a type that follows a cube law type of performance curve with respect to the power to output ratio, where a doubling of flow will typically result in an 8-fold increase in power. This same Cube law also works in reverse, where a 20% flow reduction results in a nearly 50% reduction in power. For many critical facilities however, a 20% reduction in flow imposes an unacceptable impact on the underlying process.

In such a situation, it is desirable to both maintain required flow as well as to produce a specific grid impact. In such a situation, a new grid facing appliance can be constituted through upgrades to the existing equipment.

Figure 6:
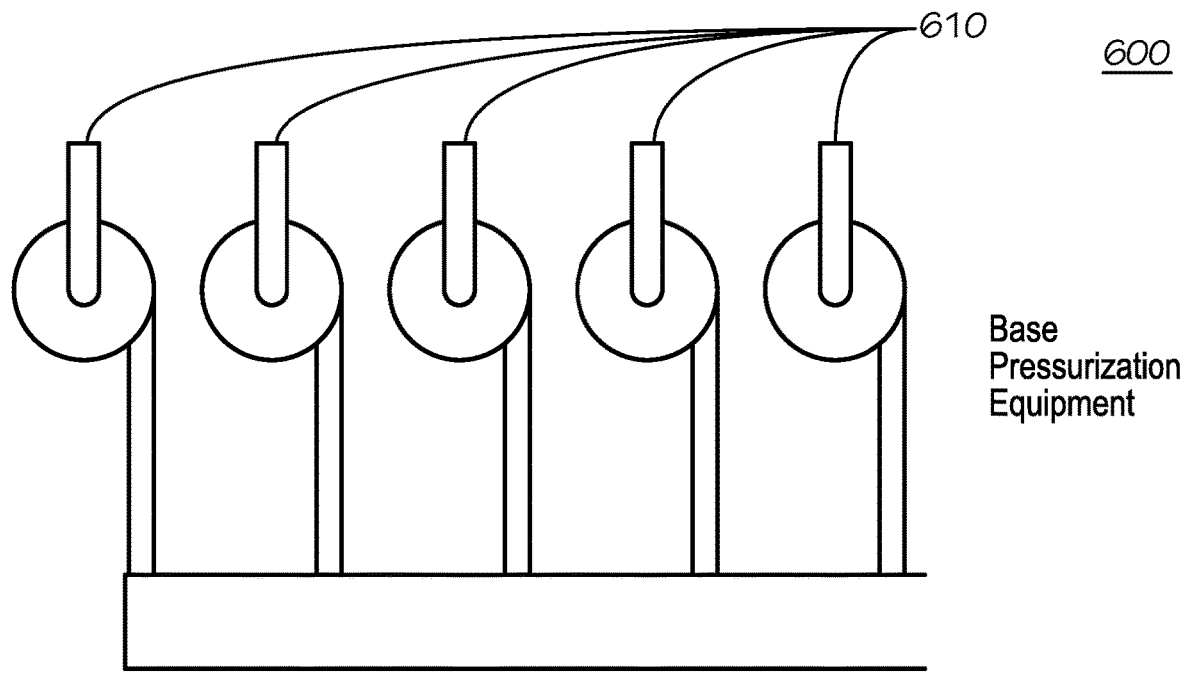
FIGS. 6-9 illustrate an example of pressurization equipment system, according to one or more embodiments of the present disclosure.

With reference to the drawings, FIG. 6 illustrates an example of a base system 600. In this example, a group of five pieces of pressurization equipment 610 are meeting the load of a given facility. In some examples, the pressurization equipment 610 could be a centrifugal pump, blower, or any other piece of equipment whose performance is described by a Cube law (or near cube law performance effect). In the example of FIG. 6, all five units 610 are identical low-pressure air compressors, although in some embodiments, all five units need not be identical. In one particular example, each unit delivers 10,000 SCFM at 10 PSIG, and is served by a 600 HP motor. Cumulative power draw for all the units operating at capacity is just over 2 MW. Each of the units could provide 8,000 SCFM for 320 HP. This curtailment in flow would result in a power reduction of approximately 1 MW, but the Process that they are serving cannot withstand a cumulative reduction of 10,000 SCFM without significant deleterious effects. It should be noted that units different from the above example can be used.

Figure 7:
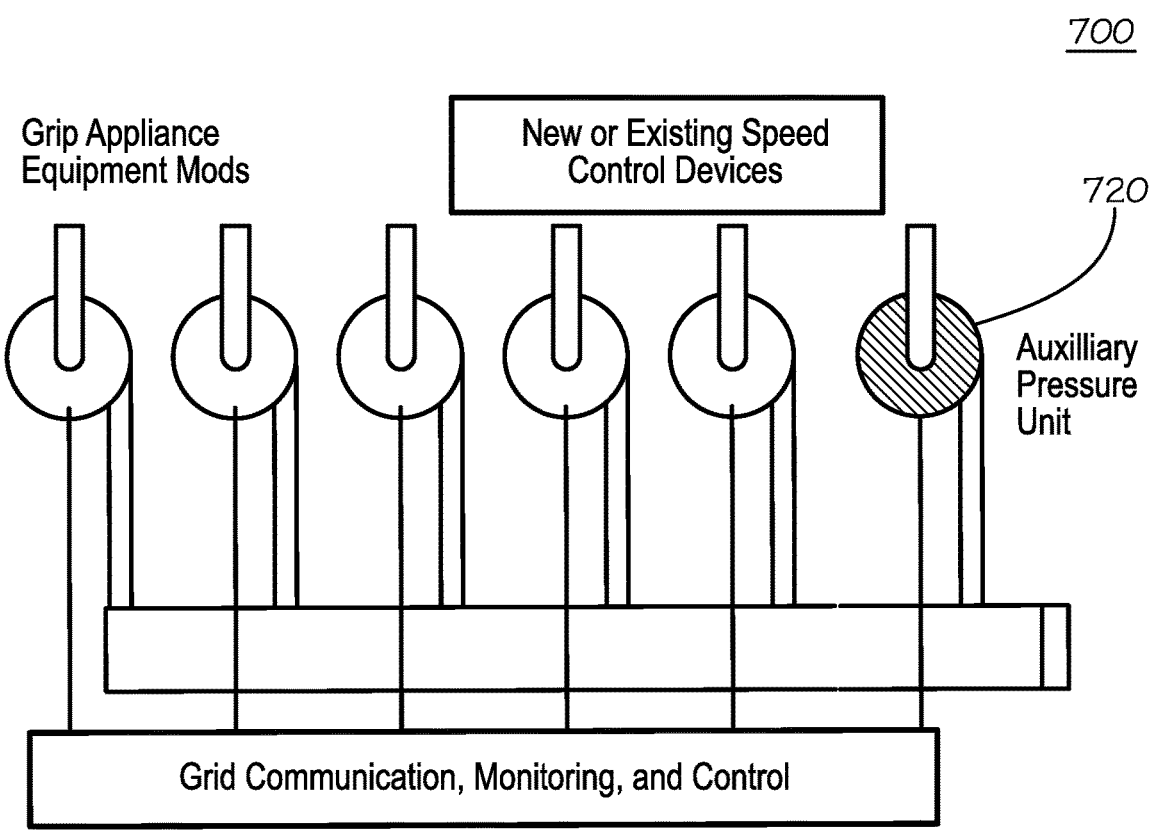

FIG. 7 illustrates an example of a grid system 700, according to one or more embodiments of the present invention. In FIG. 7, a 6th LP (low-pressure) compressor 720 is added as an auxiliary unit. This unit is identical to the other units 710 and feeds into the same header. Units 710 can be the same as, or similar to units 610 (FIG. 6). Unit 720 could provide the missing 10,000 SCFM at a cost of 600 HP, or roughly 450 KW. This results in over 500 KW of net power reduction: 1 MW curtailed from the base units 710 plus 450 KW added back for the auxiliary unit 720. The auxiliary unit 720 in this case is run from line voltage. To achieve this savings, variable speed drives are added to the base units if they are not already so equipped. Controls are also added that allow the auxiliary unit 720 to be dispatched as a grid facing asset, while the base units are simultaneously brought under grid facing control.

Figure 8:
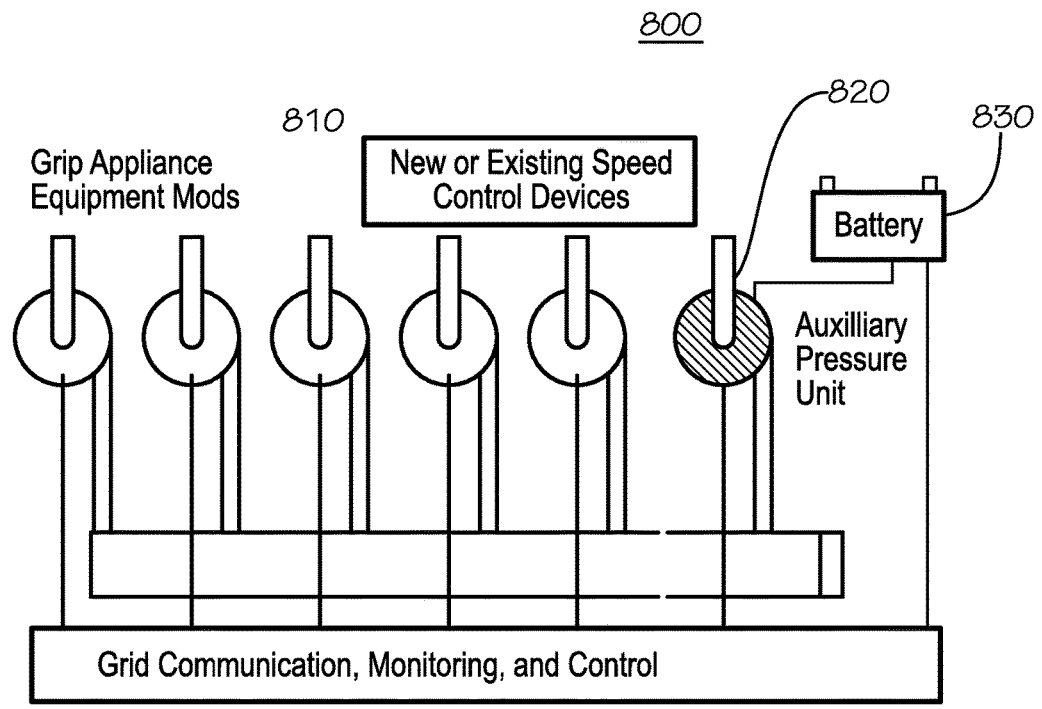

FIG. 8 illustrates another example of a grid system 800, according to one or more embodiments of the present invention. In FIG. 8, the auxiliary unit (820), which can comprise a single 600 HP compressor, is also added. However, in this example it may be powered by a battery (or other form of energy storage) instead of being run from line voltage as in the example of FIG. 7. This system delivers approximately 1 MW grid facing power reduction related to the curtailment of the base units to 80% of full flow, as mentioned above, even though the actual power output of the battery is less than half of that amount. The addition of the auxiliary compressor 820 to the existing system allows a greater than two times mechanical amplification of the battery in terms of grid impact. The entirety of the system, including the auxiliary blower, battery, and controls thus constitutes a novel form of grid appliance for delivering specific and targeted grid impacts, while reducing the cost, size and amount of potentially hazardous materials inherent in batteries needed to produce that specific grid impact.

It should also be noted that mechanical amplification effectively raises the round-trip efficiency of the battery itself. Using the above example, if a battery were 94% round trip efficient, a 1 MW discharge for 6 hours would require almost 6400 kWh of input energy. Conversely, a system with the mechanical amplification value listed above with the same efficiency and duration would require less than 2,900 kWh input energy to deliver the same 1 MW grid impact for 6 hours.

Figure 9:
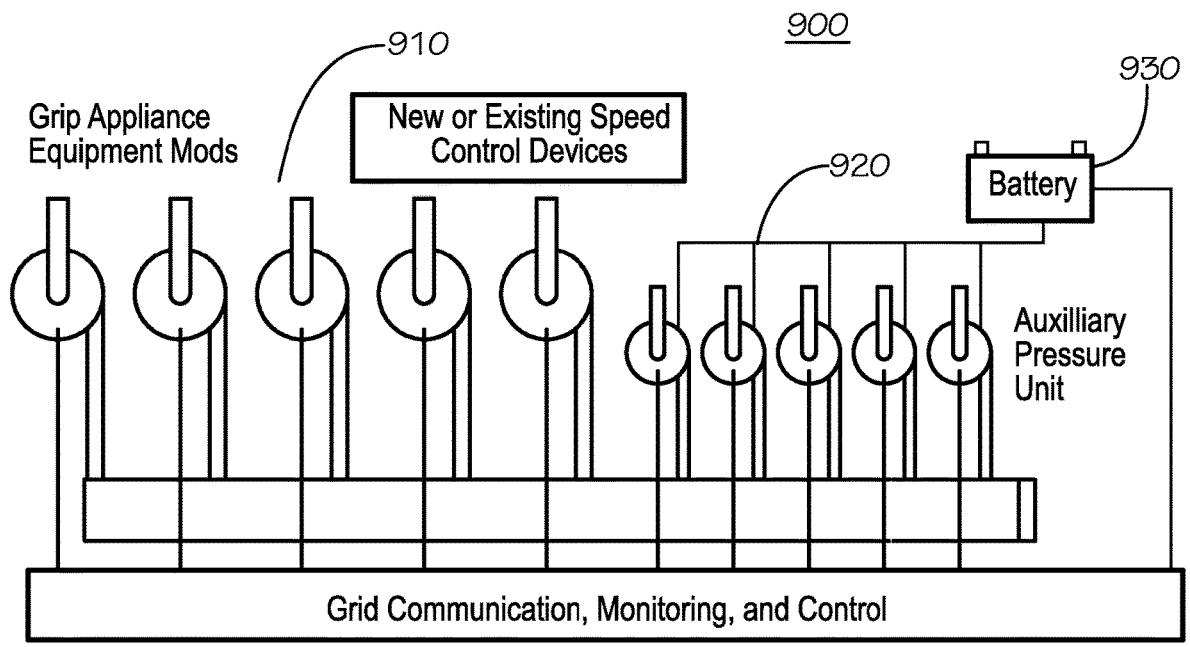

FIG. 9 illustrates an example of a grid system 900, according to one or more embodiments of the present invention. In the example of FIG. 4, instead of adding a single additional LP compressor as in the examples of FIGS.

7 and 8 above, a group of smaller compressors 920 are added. In one particular example, each of the smaller compressors is rated at 2500 SCFM with a 60 HP motor, but are instead run at 2000 CFM, drawing only 30 HP. It should be noted that in the example of FIG. 4 (as is the case with all the examples presented herein) that the specific design of the compressors and other units is merely exemplary, and that any other different types of units, with different capabilities may be used. This arrangement allows for low power when called but also allows for equipment redundancy in case of the failure of any individual unit. The total power draw of these five auxiliary units 920 is 150 HP, or just over 100 KW. In this case the mechanical amplification of the arrangement allows just over 100 KW of batteries to have a grid impact of approximately 1 MW, roughly a ten times amplification.

It is also possible that any of the batteries shown in the above examples may comprise a battery that is capable of being recharged by renewable resources. In such examples, the battery may be smaller, and the impacts of mechanical amplification would also allow the renewable asset to be correspondingly smaller as well when compared to a non-amplified battery of the same 1 MW/6 hour duration of impact. Renewable generation systems connected to such a grid appliance would not only gain from the ability to sell their grid impacts when they are most valuable and from the amplification of their output, but also from the corollary to that mechanical amplification effect: since the battery in a mechanically amplified application needs less energy than a non-amplified battery of the same grid impact and duration, less renewable generation is needed to serve a given load, which results in a lower cost of installation.

Similarly, air compressed during times of relatively low grid demand can be used to power an air-drive motor during periods of high demand. The air drive motor in turn drives a compression blower that supplies compressed air to some use, while gaining the added benefit of having the exhaust of the air motor added to the volume of the air compressed by the blower. The expansion of the air from high pressure storage to low pressure working gas generates power.

For example, aeration blowers are major energy consumers at many process facilities, such as, for example, wastewater treatment plants and other industrial facilities. Often such blowers represent half (or even more) of total plant power. The supply of compressed air cannot be reduced without the possibility of catastrophic impacts to the primary process of the facility, such as biota that are doing the actual processing of waste at a wastewater plant. The use of an air-drive motor allows for delivered air flow and pressure to be maintained while allowing curtailment of electric power. Furthermore, the curtailment of electric power can be sold back to the grid or be part of a long-term contract with an LSE, while simultaneously providing additional ancillary benefits. Also, as mentioned above, T&D Deferral and long-term utility contracts, such as, for example, PPAs also can be used to ensure that there is enough electrical supply.

Since this compression system and method can be added as a parallel compression path, such systems can be integrated into existing compressed air systems with a minimal disruption to ongoing processes. The system can also be used to power other type of rotating equipment, again allowing a reduction in electrical power draw during designated periods, particularly where the exhaust of the air drive motor can be fed to compressed air systems and utilized.

In some embodiments, an optional power generation element can be added to the system in lieu of a traditional pressure reduction device. This power generating pressure reduction device provides output power during use, thus increasing the value of a system so designed, making it more valuable to potential users and expanding the number of potentially economically viable use locations.

The system is also able to solve issues of load balancing and provide additional grid benefits by way of being dispatchable. Such systems allow existing steady state grid loads to be converted into controllable assets managed by grid operations that can be called every day. By tying this into a grid responsive control system, a grid operator can add load to the system or take load off when needed for purposes such as voltage regulation, frequency response, on/off peak arbitrage, or load balancing. Since embodiments of the present invention maintain desired compressed air flow and pressure even during periods of electric power curtailment, the system does not impose a sacrifice of functionality on the host site, increasing the number of facilities that can consider participation in grid programs. Furthermore, since the systems described do not impose a sacrifice on the host site, as it remains reliable from a grid standpoint as opposed to a sacrifice based curtailment program.

Figure 10:
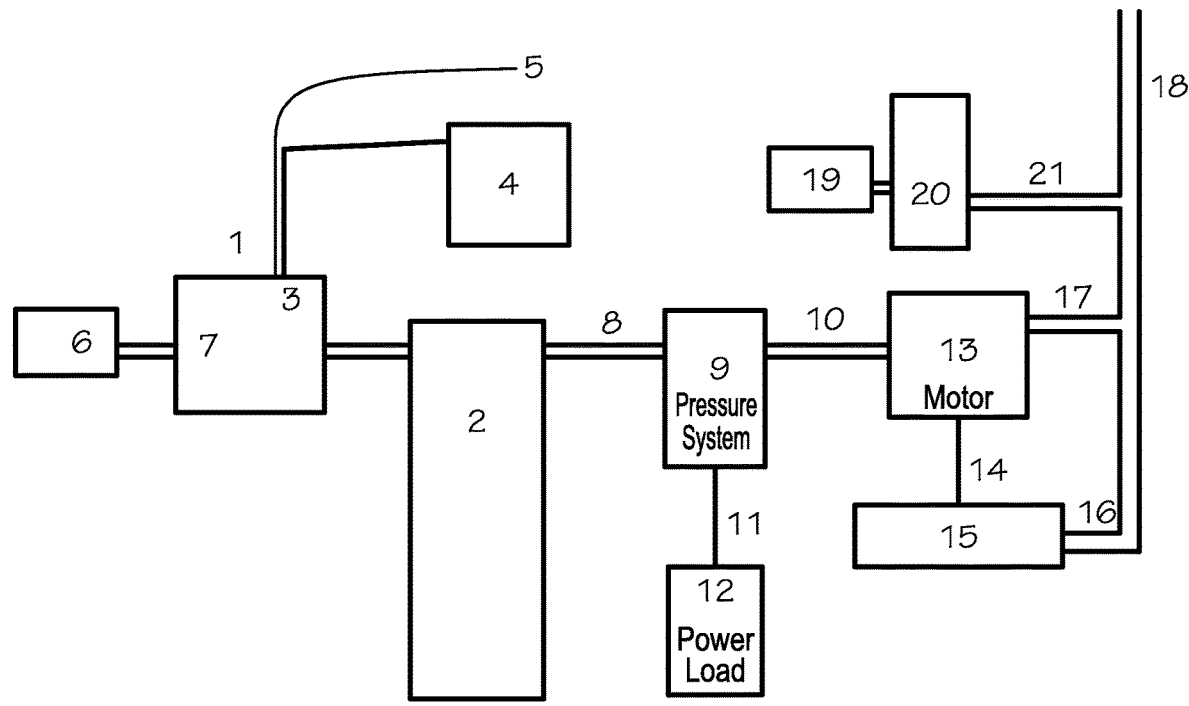
FIG. 10 illustrates an example of a low-pressure systems, according to one or more embodiments of the present disclosure.

With reference to the drawings, FIG. 10 illustrates an example of energy storage aerator system 1000. System 1000 can comprise a standard high-pressure air compressor 1001, which can be typically used during times of low grid demand, to fill a suitable pressure vessel 1002. As an example, tank 1002 may be filled on a set schedule (such as to take advantage of off-peak electric power/energy). In the same or other examples, the tank 1002 may also be filled in response to a dispatch signal from a grid operator. In the dispatch example, the running of the high-pressure compressor 1001 serves to add load to the grid when beneficial to the grid operator for balancing or other purposes. During this compression process, waste heat may be recovered from the inter-stage heat exchangers 1003 of the compressor 1001. The waste heat can be stored in a suitable thermal energy storage medium, such as, for example, a tank of hot water/glycol solution 1004. In the same or other examples, the waste heat can be used directly, as shown in stream 1005.

In some embodiments, the high-pressure compressor 1001 can be equipped with a variable frequency drive 1006, inlet guide vanes 1007, or other elements that can respond to a signal and control compressor power draw. Such equipment facilitates the use of load of the charging compressor to be dispatched by the grid operator either up or down as needed.

During discharge, high-pressure air 1008 from the pressure vessel 1002 is conducted to a pressure reduction element 1009. In one embodiment of the invention, the pressure reduction device may be a power generating pressure reduction device that uses the process of reducing the pressure from high pressure storage 1008 to a lower pressure suitable for air-motor use 1010 to generate power on a shaft 1011. The power generated can be a rotary motion that is suitable for harnessing to power a load 1012. The load 1012 may be able to serve many uses, including, for example, driving a low-pressure air blower, powering a pump shaft, or generating electric power. In addition to producing usable shaft horsepower and reducing the pressure of storage air to a pressure usable by an air-drive motor, use of an optional turbo-expander as the pressure reduction equipment (1009) provides an additional benefit. Turbo-expanders produce substantially higher amounts of output shaft horsepower during expansion than other technologies, with the added benefit of reducing the outlet lower pressure compressed air (1010) to extremely low temperatures. This is a substantial benefit in any installation where there is a collocated cooling or refrigeration load. The cooling produced by the air expansion can act like a form of Thermal Energy Storage (TES), thereby allowing a reduction in the power consumption of associated cooling equipment (not pictured) without sacrificing cooling system operation.

The lower than storage pressure air 1010 coming out of the pressure reduction device 1009 will be conducted to a throttling device at the inlet of an air drive motor 1013, with the throttling device used to control the speed of the air drive motor. In one or embodiments of the invention, the pressure reduction device 1009 can be used to control both the volume and pressure of the low-pressure air 1010 delivered to the air-drive motor 1013, thereby regulating its speed.

The output of the air drive motor 1013 is a rotating shaft 1014 that is in turn connected to a load 1015. In the example of FIG. 10, the air-motor shaft 1014 is connected to a low-pressure air blower 1015. The low-pressure blower 1015 is rotated by the air-motor shaft 1014 and discharges low pressure compressed air 1016 which is routed to a point of interconnection with the existing low-pressure air main 1018. A major benefit of this arrangement is that the exhausted low-pressure air 1017 from the outlet of the air-drive motor 1013 is itself a form of compressed air. When the product of the blower section 1016 is combined with the exhaust compressed air 1017 from the outlet of the air-drive motor 1013, the volume of low pressure compressed air delivered to the main 1018 is greater than it would have been for either the blower 1016 or the compressed air system (1008, 1010) alone.

Air-drive motors consume large volumes of compressed air in operation, and thus typically require large and expensive pressure vessels for storage. These size and cost impacts limit the ability of air-drive motors to take to take a load entirely off-grid for extended periods of time. However, many loads, such as blowers and pumps, operate on a cube law principle as demonstrated above. In cube law applications, even a modest reduction in the flow from a device results in a dramatic reduction in the power required to serve that flow. For example, if an electric motor 1019 is powering a blower 1020 that is serving a given flow 1021 has its flow reduced by 20%, the electric load on the motor 1019 is reduced by almost 50%. Therefore, provided that the electric motor 1019 is equipped with a VFD or other element that enables it to ramp down power and flow when the storage system is discharging, even modestly sized compressed air storage systems of the type described above can have a significant impact on connected load. Because of this ability to deliver disproportionate electrical grid impact, this invention can become an important part of a SmartGrid system, particularly where reliably curtailable power is being sold to a utility.

In many instances, however, air compressors run on an as needed basis and power consumption is often high during peak periods. Since the need for compressed air is often critical for the operation of the facilities where they are located, the supply of compressed air cannot be curtailed without significant negative effects. Additionally, the power requirements of these units often increase as ambient air temperature and humidity increases.

Since periods of high ambient air temperature and humidity are also often periods of high electrical demand, the result of this high and uncurtailable load is both high electric bill charges and high impacts on the electric grid. Moreover, because the input energy into the electric grid is often highest at peak load conditions, the carbon and other environmental impacts of energy used for compressing air is often disproportionately high during peak load conditions.

Figure 11:
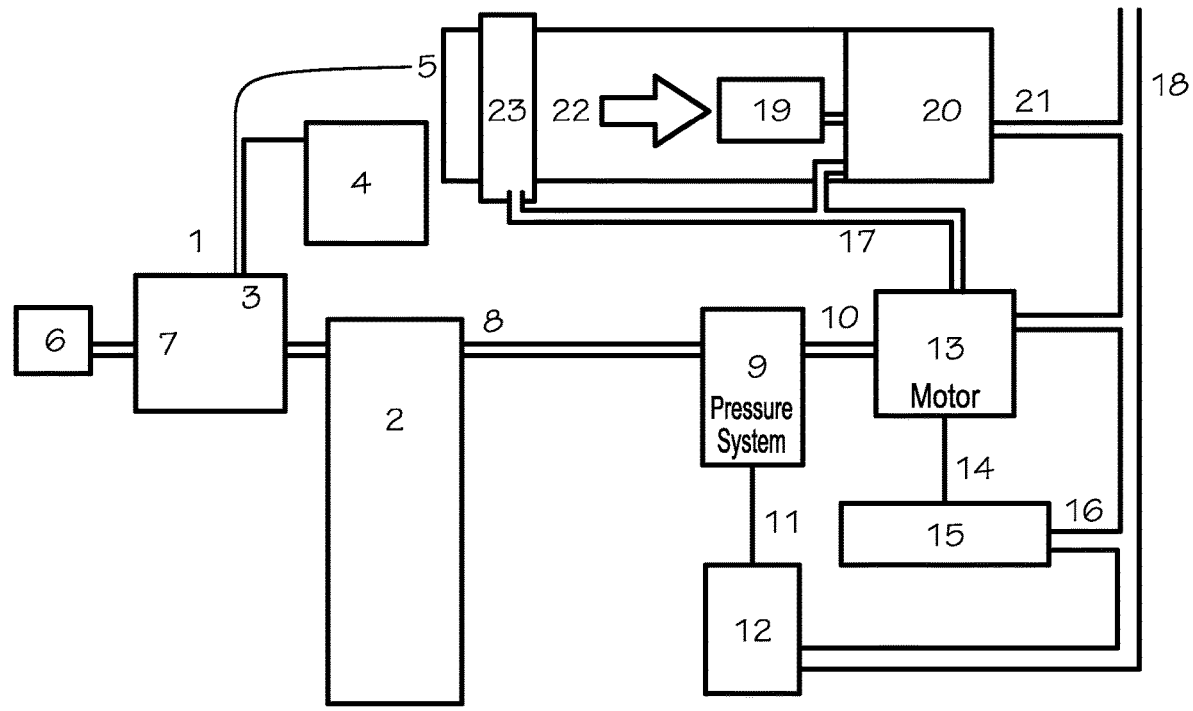
FIG. 11 illustrates an example of a high-pressure system, according to one or more embodiments of the present disclosure.

As with the examples of FIG. 10 above, the example of FIG. 11 describes use of compressed air as a way of reducing power consumption of air compressors when desired by an operator without sacrificing air flow by weight, water content, or pressure. In both examples, the air is compressed off-peak by high-pressure air compressors and stored for later use in a pressure vessel. In both examples, it is expanded for use on peak by an air-drive motor which in turn rotates the shaft of a small air compressor, allowing a slight unloading of the "base" air compressors. Because the "base" air compressors unload according to a cube law, even modest amounts of flow provided by the auxiliary air-drive compressors results in substantial reductions in instantaneous power, with a 5% reduction in base unit air flow resulting in a 14% reduction in power, and a 20% base unit air flow reduction, resulting in almost a 50% power reduction.

In the example of FIG. 10, the compressed air product being offset was low-pressure air, and the exhaust from the air drive motors was itself a form of low pressure compressed air. In the example of FIG. 11, the end product delivered to the facility is much higher pressure compressed air. Because of the pressure of the exhaust air from the air drive motor is so much lower than the working pressure in the compressed air system it cannot be piped directly into the working compressed air system as in the example of FIG. 10.

High pressure air compressor plants are negatively affected by both high ambient air temperature and high humidity. While the power consumption of a single compressor may actually go down as temperature and humidity increase, this is more than offset by the reduction in delivered mass flow of delivered air. Effectively, the reduction in power on individual compressors is more than negated by the need to bring additional compressors or stages on line to maintain a given weight of flow and pressure. In the system presented in FIG. 11, the exhaust from the air-drive motor is used to improve the condition of the incoming inlet air to the main compressors. The exhaust air is both colder and drier than the ambient untreated inlet air conditions, particularly at summer peak load. The exhaust of the air-drive motors is used to improve these entering conditions of inlet air to the "base" compressors, allowing dispatchable power reduction without interruption of mass flow or a reduction in delivered working pressure.

FIG. 11 illustrates an example of a system 1100, according to an exemplary embodiment. System 1100 can comprise a high-pressure air compressor 1101. During times of low grid demand, compressor 1101 can be used to fill a suitable pressure vessel 1102. Similar to the example of FIG. 10, the filling of tank 1102 may be based upon a schedule (such as to take advantage of off-peak electric power/ energy), or be in response to a dispatch signal from a grid operator.

When tank 1102 is filled due to a dispatch signal, the running of the high-pressure compressor 1101 serves to add load to the grid when beneficial to the grid operator for balancing or other purposes. During this compression process, waste heat may be recovered from the inter-stage heat exchangers 1103 of the compressor 1101. The waste heat can be stored in a suitable thermal energy storage medium, such as a tank of hot water/glycol solution 1104 or utilized directly, as seen in stream 1105.

The high-pressure compressor 1101 may be equipped with a variable frequency drive 1106, inlet guide vanes 1107, or other elements that can respond to a signal and control compressor power draw. This facilitates the use of load of the charging compressor to be dispatched by the grid operator either up or down grid impact as needed.

During discharge, high pressure air 1108 from the pressure vessel 1102 is conducted to a pressure reduction element 1109. In one or more embodiments of the present invention, the pressure reduction device 1109 will itself be a power generating pressure reduction device that uses the process of reducing the pressure from high pressure storage 1108 to a lower pressure suitable for air-motor 1110 use to generate power on a shaft 1111. The power generated may be a rotary motion that is suitable for harnessing to power a load 1112. The load 1112 could serve many uses, including driving a high-pressure compressor, powering a pump shaft, or generating electric power as examples. In the example of FIG. 11, load 1112 is shown driving a working pressure air compressor, and delivering the air to the main 1118. As mentioned above, with respect to the example of FIG. 10, pressure reduction device 1109 can comprise a turbo-expander, with the attendant refrigeration/thermal Energy Storage benefits listed above with respect to the example of FIG. 10.

The lower pressure air coming out of the pressure reduction device 1110 will be conducted to a throttling device at the inlet of an air drive motor 1113, with the throttling device used to control the speed of the air drive motor. In an alternate embodiment of the invention, the pressure reduction device 1109 can be used to control both the volume and pressure of the low-pressure air 1110 delivered to the air-drive motor 1113, thereby regulating its speed.

The output of the air drive motor 1113 is a rotating shaft 1114 that is in turn connected to a load 1115. In the example of FIG. 11, the air-motor shaft 1114 is connected to a working pressure air compressor 1115. The working pressure compressor 1115 is rotated by the air-motor shaft 1114 and discharges working pressure compressed air 1116 which is routed to a point of interconnection with the existing working pressure air main 1118.

A benefit of this arrangement shown in FIG. 11 is that the exhausted low-pressure air 1117 from the outlet of the air-drive motor 1113 is itself beneficial to the operation of the "base" working pressure air compressor 1120 and the electric load of its associated motor 1119. The air-motor exhaust air is both lower in temperature and moisture than the ambient air 1122 coming in to the base compressor 1120. By combining the "waste" air drive exhaust 1117 to the ambient air entering the base compressor 1122, a lower temperature and moisture inlet airflow is provided to the base compressor 1120 than would have been present in the absence of the equipment.

With continued reference to FIG. 11, the air motor exhaust 1117 can run through a heat exchanger 1123 prior to entering the base compressor inlet airflow 1122. Under this arrangement, the low temperature of the air motor exhaust 1117 is used to both lower the sensible temperature and condense water vapor from the compressor inlet air. Any moisture condensed from the air in this arrangement can be removed prior to the inlet air reaching the first stage of the compressor, reducing the amount that needs to be removed later in the process.

Furthermore, the example of FIG. 11 comprises an auxiliary air compression system that is capable of reducing power by providing a portion of the air flow weight that would otherwise need to be provided by the base air compressors. Air-drive motors consume large volumes of compressed air in operation, and thus typically require large and expensive pressure vessels for storage. These size and cost impacts limit the ability of air-drive motors to take to take a load entirely off-grid for extended periods of time. However, many loads, such as blowers and pumps, for example, operate on a cube law principle (as explained above), at least over a portion of their operating range. In cube law applications, even a modest reduction in the flow from a device results in a dramatic reduction in the power required to serve that flow. Therefore, provided that the electric motor 1119 is equipped with a VFD or other element that enables it to ramp down power and flow when the storage system is discharging, even modestly sized compressed air storage systems of the type described above can have a significant impact on connected load.

Air-cooled refrigeration and HVACR systems can also be improved with condensers are other pieces of equipment that can similarly be improved for the power grid.

Air-cooled refrigeration condensers have decreasing efficiency and increased power consumption as ambient air temperature increases. In rack style systems, the compressors not only supply hot, high pressure refrigerant gas as part of the vapor compression cycle, they also provide the motive force to move the refrigerant to distant evaporators and/or provide the force needed to operate thermostatic expansion valves.

Improved systems and methods of refrigerant condensation is provided to a refrigeration system. Embodiments herein can be a permanent operating alteration, one that operates on a schedule, one that is triggered by ambient conditions, or one that responds to a control signal from an entity such as a grid operator. Examples of methods that can be used for this function can comprise the use of evaporative pre-coolers, compressed air or other gasses, or use of thermal energy storage.

Figure 12:
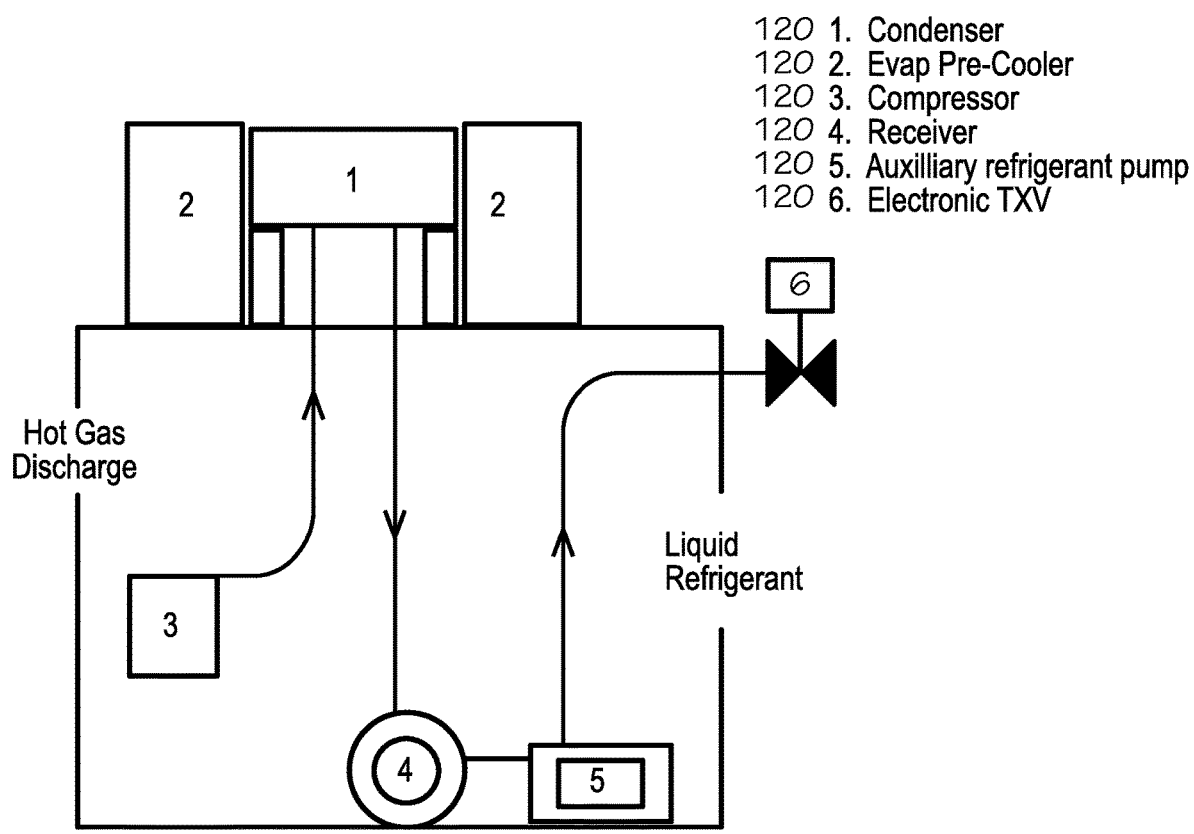
FIG. 12 illustrates an example of refrigeration condensing unit precooler system, according to one or more embodiments of the present disclosure.

To overcome operating issues relating to a lack of refrigerant pressure, modifications to the downstream portion of a refrigerant system can be made. With reference to FIG. 12, an auxiliary refrigerant pump 1205 may be added to move refrigerant from the receiver 1204 to the evaporators, eliminating the need to rely upon the compressors for refrigerant transport when the enhanced condensation element is in operation. In addition, mechanically operated thermostatic expansion valves (TXVs) at the evaporators can be replaced with electronic TXVs 1206 to remove the need for compressors to provide the mechanical force needed to operate the TXV. In some embodiments, piping arrangements may be modified so that the power required to move the refrigerant from the condensing section to the evaporators can be reduced.

For example, such systems can comprise the use of condensate for peak shaving via spray evaporation for evaporative cooling or precooling of air; controls tie-in for optimization of any condensate usage via variable speed drives (fan/compressor), water level, length of spray time allowed, future weather forecast and predictive condensate generation from the building both for use during peak demand and for times of excess condensate to use for energy efficiency savings for customers; the ability through Internet of Things to allow utilities to manage these stores of condensate as peak demand energy storage potential to optimize the energy grid use, utility investments and reduce utilities fugitive emissions as well as $CO_2$ emissions through the continued use of higher efficiency energy sources (renewable sources) and high efficiency power plants; the ability to predictively use weather forecasting to prioritize condensate for secondary uses like, irrigation, potable water, rehumidification, cooling tower makeup water, toilet or urinal flushing; can be used with refrigerant systems with lower critical temperatures, like $CO_2$ or R-404A, to apply reuse of condensate to refrigeration condensers to optimize the efficiency or increase the efficiency of $CO_2$ systems to improve the use of natural refrigerants like $CO_2$, and reduce the use of primary municipality water supplies through the predictive use of condensate and/or rain water storage for irrigation, cooling tower water, rehumidification, potable or urinal/toilet flushing. In addition, this may reduce the municipalities' sanitary waste demand by removing condensate from sanitary emissions.

Aspects

Any aspects 1-7 can be combined with any aspects 8-19. Any aspects 8-12 can be combined with any aspects 13-19. Any aspects 13-16 can be combined with any aspects 17-19. Aspect 17 can be combined with any aspect 18-19. Aspect 18 can be combined with aspect 19.

Aspect 1. A system for controlling the connected electric and cooling loads in systems with intermittent generation assets having a renewable energy system; a motor controller; an inverter; a large-scale equipment system; and an auxiliary large-scale equipment system.

Aspect 2. The system in accordance with aspect 1 further having a thermal energy storage system.

Aspect 3. The system in accordance with aspects 1-2; wherein the motor controller receives data from the inverter via a communication link.

Aspect 4. The system in accordance with aspect 3, wherein the data includes information related to variation in output power.

Aspect 5. The system in accordance with any of aspects 1-4, wherein the large-scale equipment system includes a chiller.

Aspect 6. The system in accordance with any of aspects 1-5, further including an electric energy storage system; wherein the electric energy storage system is configured to allow the storage and rapid release of electrical energy.

Aspect 7. The system in accordance with any of aspects 1-6, wherein the renewable energy system is isolated from electric grid.

Aspect 8. A system for controlling the load in systems with intermittent generation assets that includes a renewable energy system; a bus bar connected to grid power; a motor controller; an inverter; a large-scale equipment system; and an auxiliary large-scale equipment system.

Aspect 9. The system in accordance with aspect 8, further comprising a thermal energy storage system.

Aspect 10. The system in accordance with any of aspects 8-9, wherein the motor controller receives data from the inverter via a communication link.

Aspect 11. The system of aspect 10, wherein the data comprises information related to variation in output power.

Aspect 12. The system of aspect 11, wherein the grid power can be used to balance the needed power of the auxiliary large-scale equipment system and the power supplied by the renewable energy system.

Aspect 13. A method of balancing a load of a large-scale equipment system that includes supplying power to an inverter via a renewable energy system; sending data comprising from an inverter to a motor controller; and adapting the connected load via the motor controller the meet the amount of load power needed, wherein the data comprises information on the variation in output power from the renewable energy system.

Aspect 14. The method in accordance with claim 13 that further includes supplying additional power to meet the amount of load power needed.

Aspect 15. The method in accordance with aspect 14 wherein the additional power is supplied via an electric energy storage system.

Aspect 16. The method in accordance with any of aspects 14-15 wherein the additional power supplied via grid power and bus bar.

Aspect 17. A grid appliance having one or more base pieces of equipment; one or more auxiliary pieces of equipment wherein the one or more base pieces of equipment and auxiliary pieces of equipment includes pressurization equipment that function at or approximately at cube law performance effect; the one or more base pieces of equipment include variable speed drives; the one or more auxiliary pieces of equipment are capable of providing the missing flow of the one or more base pieces of equipment when the one or more base pieces of equipment are curtailed; and the total power consumption of the appliance running with the one or more base pieces of equipment curtailed and the one or more auxiliary pieces is less than the appliance running with the one or more base pieces of equipment at full flow.

Aspect 18. An energy storage aerator system that includes a high pressure air compressor; a pressure vessel; a pressure reduction device; and a load; wherein the high pressure air compressor can fill the pressure vessel with compressed air; high pressure air is discharged from the pressure vessel and is conducted to a pressure reduction device; the pressure reduction device can generate power on a shaft when the air pressure is reduced in the pressure reduction device; and the power generated during the pressure reduction can be harnessed to power a load.

Aspect 19. A system for improving an air compressor that includes a high pressure air compressor; a pressure vessel; a pressure reduction device; an air drive motor; and a base air compressor; wherein the high pressure air compressor can fill the pressure vessel with compressed air; high pressure air is discharged from the pressure vessel and is conducted to a pressure reduction device; lower pressure air exiting the pressure reduction device powers the air drive motor; exhaust from the air drive motor is combined with ambient air, thereby reducing the temperature and moisture of the ambient air; and the combined air stream is used by the base air compressor.

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the systems and methods discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for controlling the connected electric and cooling loads in systems with intermittent generation assets, comprising:
   a large-scale equipment system that is powered by an electric energy storage system and, in operation, produces a first output of a combined output that is determined to meet a demand, wherein the electric energy storage system is configured to be capable of rapid release of the electric energy;
   a renewable energy system;
   an auxiliary large-scale equipment system that powered by the renewable energy system and, in operation, produces a second output of the combined output;
   an inverter that is electrically coupled to the renewable energy system and the auxiliary large-scale equipment system; and
   a motor controller that controls the auxiliary large-scale equipment system in response to demand data, representative of the demand, and inverter data, representative of operation of the inverter;
   wherein, in response to a determination that combined output satisfies the demand, the motor controller instructs the inverter to store excess electric energy system supplied by the renewable energy system to the electric energy storage system; and
   wherein, in response to a determination that power supplied by the renewable energy system varies more rapidly than the auxiliary large-scale equipment system can ramp power, the motor controller instructs the inverter to temporarily supply the auxiliary large-scale equipment system from the electric energy storage system.

2. The system of claim 1, wherein the electric energy storage system further comprises a thermal energy storage system that stores a portion of the second output in response to the motor controller determining that the combined output exceeds the demand.

3. The system of claim 1, wherein the motor controller receives the inverter data from the inverter via a communication link.

4. The system of claim 3, wherein the inverter data comprises information related to variation in power supplied by the renewable energy system.

5. The system of claim 2, wherein the motor controller issues an indication that a portion of the demand is to be met from a supply stored at the thermal energy storage system in response to a condition being determined to be satisfied.

6. A method of balancing a load of a large-scale equipment system, comprising:
   determining, by a controller, that a demand is met by a combined output of equipment, wherein the combined output comprises a first output produced by first equipment coupled to an electric energy storage system configured to be capable of rapid release of the electric energy and a second output produced by second equipment coupled to a renewable energy system;
   receiving, by the controller, inverter data indicative of variation in power supplied to an inverter via a renewable energy system;
   adapting, by the controller, a load of the second equipment in response to the inverter data in a manner determined to adjust to the variations in power supplied and meet the demand,
   wherein, in response to a determination that combined output satisfies the demand, the motor controller instructs the inverter to store excess electric energy system supplied by the renewable energy system to the electric energy storage system; and
   wherein, in response to a determination that power supplied by the renewable energy system varies more rapidly than the auxiliary large-scale equipment system can ramp power, the motor controller instructs the inverter to temporarily supply the auxiliary large-scale equipment system from the electric energy storage system.

7. The method of claim 6, wherein the adapting the load further comprises instructing, by the controller, the inverter to power the second equipment by the renewable energy system and additional power supplied by the electric energy storage system.

8. The method of claim 7, further comprising, instructing, by the controller, that the demand is met by the combined output and a supplemental output from a thermal energy storage system included within the electric energy storage system.

* * * * *